(12) United States Patent
Jung et al.

(10) Patent No.: US 11,113,202 B2
(45) Date of Patent: Sep. 7, 2021

(54) OPERATING METHOD FORCING THE SECOND OPERATION TO FAIL USING A SCATTER-GATHER BUFFER AND MEMORY SYSTEM THEREOF

(71) Applicant: SK hynix Inc., Gyeonggi-do (KR)

(72) Inventors: Hoe-Seung Jung, Seoul (KR); Joo-Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 37 days.

(21) Appl. No.: 16/682,648

(22) Filed: Nov. 13, 2019

(65) Prior Publication Data

US 2020/0327065 A1 Oct. 15, 2020

(30) Foreign Application Priority Data

Apr. 11, 2019 (KR) .................... 10-2019-0042571

(51) Int. Cl.
*G06F 12/0882* (2016.01)
*G06F 12/0846* (2016.01)
(Continued)

(52) U.S. Cl.
CPC .......... *G06F 12/0882* (2013.01); *G06F 9/544* (2013.01); *G06F 11/073* (2013.01); *G06F 12/0246* (2013.01); *G06F 12/0851* (2013.01)

(58) Field of Classification Search
CPC ............. G06F 12/0882; G06F 12/0851; G06F 11/073; G06F 9/544; G06F 12/0246;
(Continued)

(56) References Cited

U.S. PATENT DOCUMENTS

| 6,425,053 B1* | 7/2002 | Considine | ............... G06F 3/061 710/74 |
| 2010/0106893 A1* | 4/2010 | Fasoli | ................. G11C 16/102 711/103 |

(Continued)

FOREIGN PATENT DOCUMENTS

| KR | 10-1212739 | 12/2012 |
| KR | 10-1579555 | 12/2015 |

OTHER PUBLICATIONS

Kohlhoff,C M., https:www.boost.org/doc/libs/1_56_0/doc/html/boost_asio/overview/core/buffers.html, Buffers, Aug. 17, 2003, Version 1.0, Boost Software License.

*Primary Examiner* — Hong C Kim
(74) *Attorney, Agent, or Firm* — IP & T Group LLP

(57) ABSTRACT

A memory system includes: a memory device including a memory block, a page buffer, and first and second memory dies; a write buffer suitable for temporarily storing first and second data; a program managing unit suitable for controlling the memory device to sequentially perform first and second program operations on the memory block with the first and second data; a buffer managing unit suitable for managing the write buffer based on a scatter-gather scheme; a failure processing unit suitable for forcing the second program operation to fail, when the first program operation is a failure; and an error handling unit suitable for controlling the program managing unit to perform the first and second program operations again for the first and second data that are temporarily stored in the write buffer when the second program operation is forced to fail.

20 Claims, 14 Drawing Sheets

(51) Int. Cl.
*G06F 11/07* (2006.01)
*G06F 12/02* (2006.01)
*G06F 9/54* (2006.01)

(58) Field of Classification Search
CPC .. G06F 2209/481; G06F 9/485; G06F 3/0614; G06F 3/0656; G06F 3/0652; G06F 3/0679; G11C 16/0483; G11C 16/10; G11C 16/3436
USPC ......... 714/2, 16, 48; 711/154, 158, 118, 157
See application file for complete search history.

(56) References Cited

U.S. PATENT DOCUMENTS

2010/0269014 A1* 10/2010 Kidney ............... G06F 11/1076
  714/758
2013/0262398 A1* 10/2013 Gygi ....................... G06F 13/28
  707/687
2018/0150301 A9* 5/2018 Hughes ............... G06F 9/30043

* cited by examiner

| | |
|---|---|
| INDEX1 | DATA 1 |
| INDEX2 | DATA 3 |
| INDEX3 | DATA 5 |
| INDEX4 | DATA 7 |
| INDEX5 | DATA 4 |
| INDEX 6 | DATA 8 |
| INDEX 7 | DATA 6 |
| INDEX 8 | DATA 2 |

504

| INDEX | STATUS | DATA |
|---|---|---|
| 1 | 1 | DATA 1 |
| 2 | 1 | DATA 3 |
| 3 | 1 | DATA 5 |
| 4 | 1 | DATA 7 |
| 5 | 1 | DATA 4 |
| 6 | 1 | DATA 8 |
| 7 | 1 | DATA 6 |
| 8 | 1 | DATA 2 |

| | |
|---|---|
| INDEX1 | DATA 1 |
| INDEX2 | DATA 3 |
| INDEX3 | DATA 5 |
| INDEX4 | DATA 7 |
| INDEX5 | DATA 4 |
| INDEX 6 | DATA 8 |
| INDEX 7 | DATA 6 |
| INDEX 8 | |

508

| INDEX | STATUS | DATA |
|---|---|---|
| 1 | 1 | DATA 1 |
| 2 | 1 | DATA 3 |
| 3 | 1 | DATA 5 |
| 4 | 1 | DATA 7 |
| 5 | 1 | DATA 4 |
| 6 | 1 | DATA 8 |
| 7 | 1 | DATA 6 |
| 8 | 0 | NULL |

FIG. 5C

| | 510 |
|---|---|
| INDEX1 | DATA 1 |
| INDEX2 | DATA 3 |
| INDEX3 | DATA 5 |
| INDEX4 | DATA 7 |
| INDEX5 | DATA 4 |
| INDEX 6 | DATA 8 |
| INDEX 7 | DATA 6 |
| INDEX 8 | DATA 9 |

| INDEX | STATUS | DATA 512 |
|---|---|---|
| 1 | 1 | DATA 1 |
| 2 | 1 | DATA 3 |
| 3 | 1 | DATA 5 |
| 4 | 1 | DATA 7 |
| 5 | 1 | DATA 4 |
| 6 | 1 | DATA 8 |
| 7 | 1 | DATA 6 |
| 8 | 1 | DATA 9 |

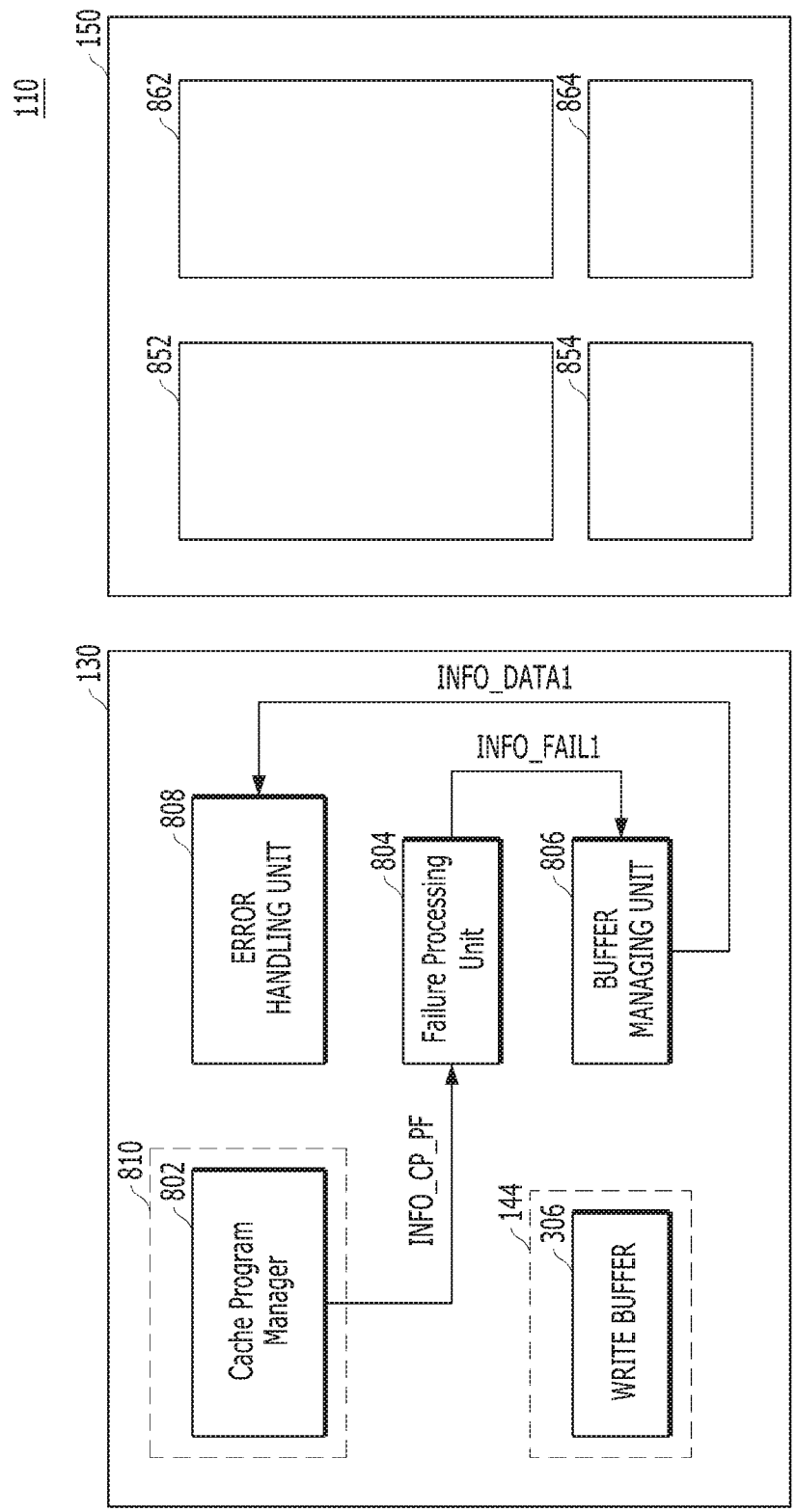

OPERATING METHOD FORCING THE SECOND OPERATION TO FAIL USING A SCATTER-GATHER BUFFER AND MEMORY SYSTEM THEREOF

CROSS-REFERENCE TO RELATED APPLICATIONS

The present application claims priority of Korean Patent Application No. 10-2019-0042571, filed on Apr. 11, 2019, which is incorporated herein by reference in its entirety.

BACKGROUND

1. Field

Various embodiments of the present invention relate to a data processing system, and more particularly, to a memory system for efficiently performing error handling while using a scatter-gather buffer method, and a method for operating the memory system.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSD).

SUMMARY

Embodiments of the present invention are directed to a memory system that may efficiently perform error handling by forcing a current program operation to fail, when a program operation is being performed by using a write buffer based on a scatter-gather scheme and the preceding program operation which is performed right before the current program operation fails.

In accordance with an embodiment of the present invention, a memory system includes: a memory device including a memory block, a page buffer, and first and second memory dies; a write buffer suitable for temporarily storing first and second data; a program managing unit suitable for controlling the memory device to sequentially perform first and second program operations on the memory block with the first and second data; a buffer managing unit suitable for managing the write buffer based on a scatter-gather scheme; a failure processing unit suitable for forcing the second program operation to fail, when the first program operation is a failure; and an error handling unit suitable for controlling the program managing unit to perform the first and second program operations again for the first and second data that are temporarily stored in the write buffer when the second program operation is forced to fail.

In accordance with another embodiment of the present invention, a method for operating a memory system includes: temporarily storing first data and second data; sequentially performing a first program operation and a second program operation on a memory block with the first data and the second data; managing a write buffer based on a scatter-gather scheme; forcing the second program operation to fail when the first program operation is a failure; and controlling the first and second program operations to be performed again for the first and second data that are temporarily stored in the write buffer, when the second program operation is forced to fail.

In accordance with anther embodiment of the present invention, a memory system includes: a memory device; and a controller including a buffer configured to buffer first and second data according to a scatter-gather scheme, wherein the controller is configured to: control the memory device to perform a pipeline-schemed program operation of programming the buffered first data and subsequently programming the buffered second data; process the subsequent programming as a failure when the first programming fails, and control the memory device to perform again the first programming and the subsequent programming respectively with the buffered first and second data.

BRIEF DESCRIPTION OF THE DRAWINGS

FIGS. 5A to 5C illustrate a method of operating a write buffer according to a scatter-gather buffer scheme.

FIG. 8 is a block diagram illustrating the memory system 110 in accordance with an embodiment of the present invention.

DETAILED DESCRIPTION

Figure 1:
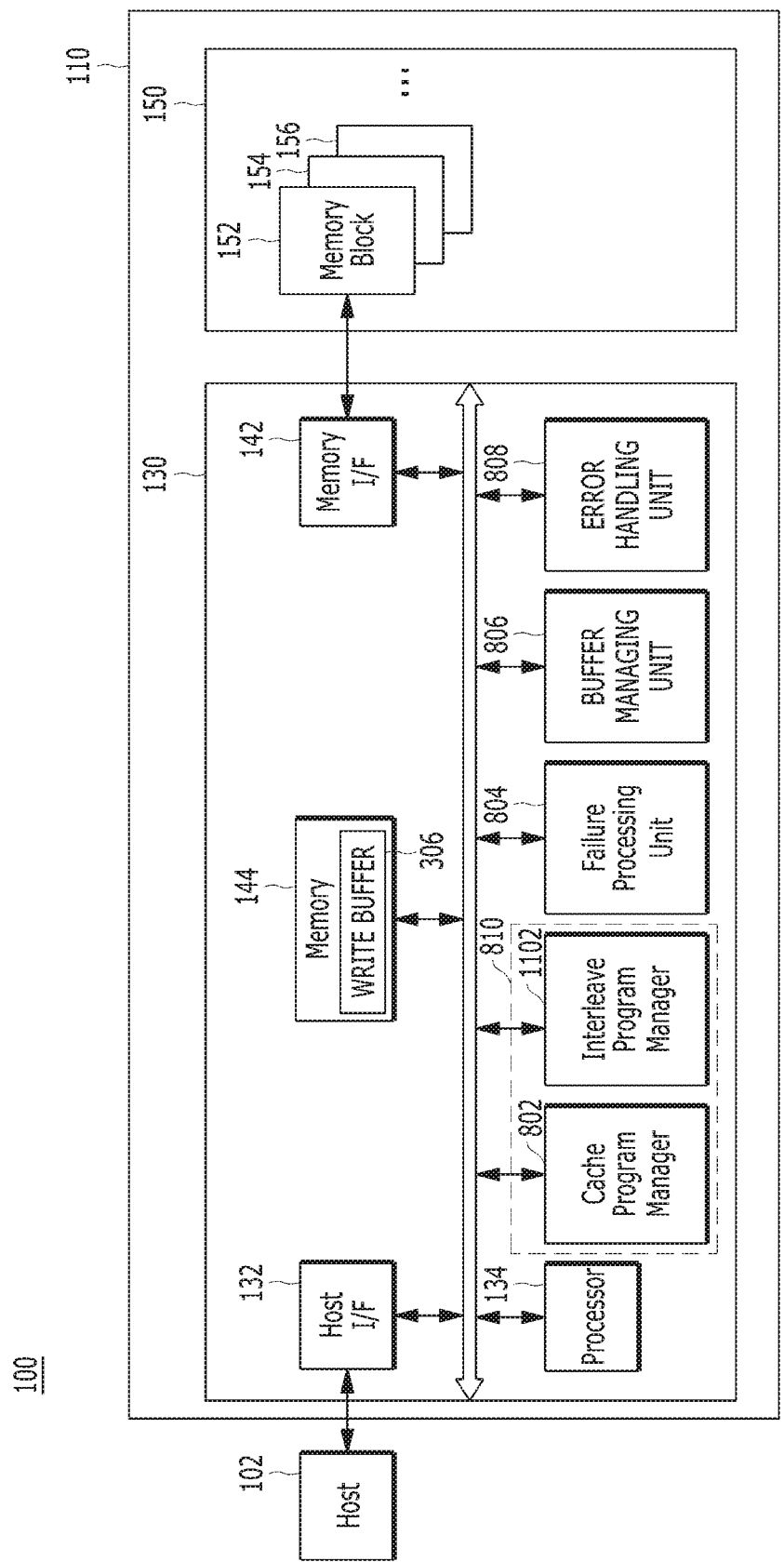
FIG. 1 is a block diagram illustrating a data processing system including a memory system in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

It will be understood that, although the terms "first" and/or "second" may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, when an element is referred to as being "directly coupled" or "directly connected" to another element, there are no intervening elements present. Other expressions that describe the relationship between elements, such as "between", "directly between", "adjacent to" or "directly adjacent to" should be construed in the same way.

The terminology used herein is for the purpose of describing embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof.

Hereinafter, the various embodiments of the present invention will be described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include at least one OS (operating system) or a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, and an UFS device. The memory system 110 may be configured as a part of a computer, a smart phone, a portable game player, or one of various components configuring a computing system.

The memory device 150 may be a nonvolatile memory device which may retain stored data even when power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each is plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. Thus, the controller 130 may control the read, write, program and erase operations of the memory device 150.

The controller 130 may include a host interface (I/F) 132, a processor 134, a memory interface 142, and a memory 144, all operatively coupled or engaged via an internal bus. The controller 130 may further include a program managing unit 810, a failure processing unit 804, a buffer managing unit 806, and an error handling unit 808, as described later in more detail with reference to FIG. 8 and FIG. 11. The memory 144 may include a write buffer 306. The program managing unit 810 may include a cache program manager 802 and an interleave program manager 1102.

The host interface 132 may process a command and data of the host 102. The host interface 132 may communicate with the host 102 through one or more various interface protocols such as universal serial bus (USB), multi-media card (MMC), peripheral component is interconnect-express (PCI-E), small computer system interface (SCSI), serial-attached SCSI (SAS), serial advanced technology attachment (SATA), parallel advanced technology attachment (DATA), enhanced small disk interface (ESDI) and integrated drive electronics (IDE). The host interface 132 may be driven via a firmware, that is, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In an embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150 and other data required for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor or a central processing unit (CPU).

For example, the controller 130 may perform an operation requested by the host 102 in the memory device 150 through the processor 134, which is implemented as a microprocessor, a CPU, or the like. Also, the controller 130 may perform a background operation on the memory device 150 through the processor 134, which may be realized as a microprocessor or a CPU. The background operation performed on the memory device 150 may include an operation of copying and processing data stored in some memory blocks among the memory blocks 152 to 156 of the memory device 150 into other memory blocks, e.g., a garbage collection (GC) operation, an operation of performing swapping between the memory blocks 152 to 156 or between the data of the memory blocks 152 to 156, e.g., a wear-levelling (WL) operation, an operation of storing the map data stored in the controller 130 in the memory blocks 152 to 156, e.g., a map flush operation, or an operation of managing bad blocks of the is memory device 150, e.g., a bad block management operation of detecting and processing bad blocks among the memory blocks 152 to 156 in the memory device 150.

Hereinafter, the memory device in the memory system in accordance with the embodiment of the present invention will be described in more detail with reference to FIG. 2.

Figure 2:
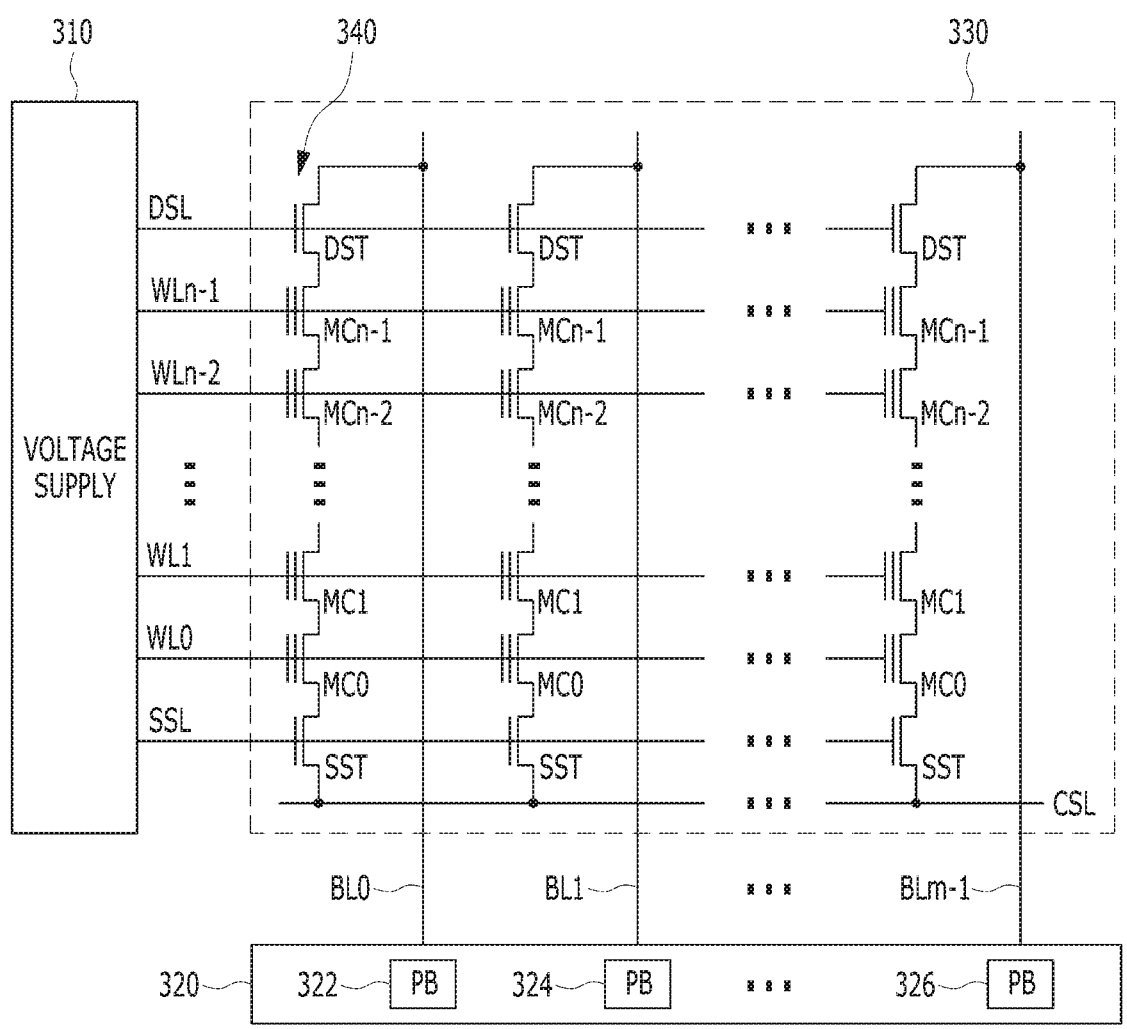
FIG. 2 is a circuit diagram illustrating a configuration of a memory cell array of a memory block in the memory device shown in FIG. 1.

Referring to FIG. 2, the memory block 330 may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 13, the first cell string is coupled to the first bit line BL0, and the last cell string is coupled to the last bit line BLm-1.

Although FIG. 2 illustrates NAND flash memory cells, the present disclosure is not limited thereto. It is noted that the memory cells may be NOR flash memory cells, or hybrid flash memory cells including two or more types of memory cells combined therein. Also, it is noted that the memory device 150 may be a flash memory device is including a conductive floating gate as a charge storage layer or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select at least one of the memory blocks (or sectors) of the memory cell array, select at least one of the word lines of the selected memory block, and provide the word line voltages to the selected word line(s) and the unselected word lines as may be needed.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 3:
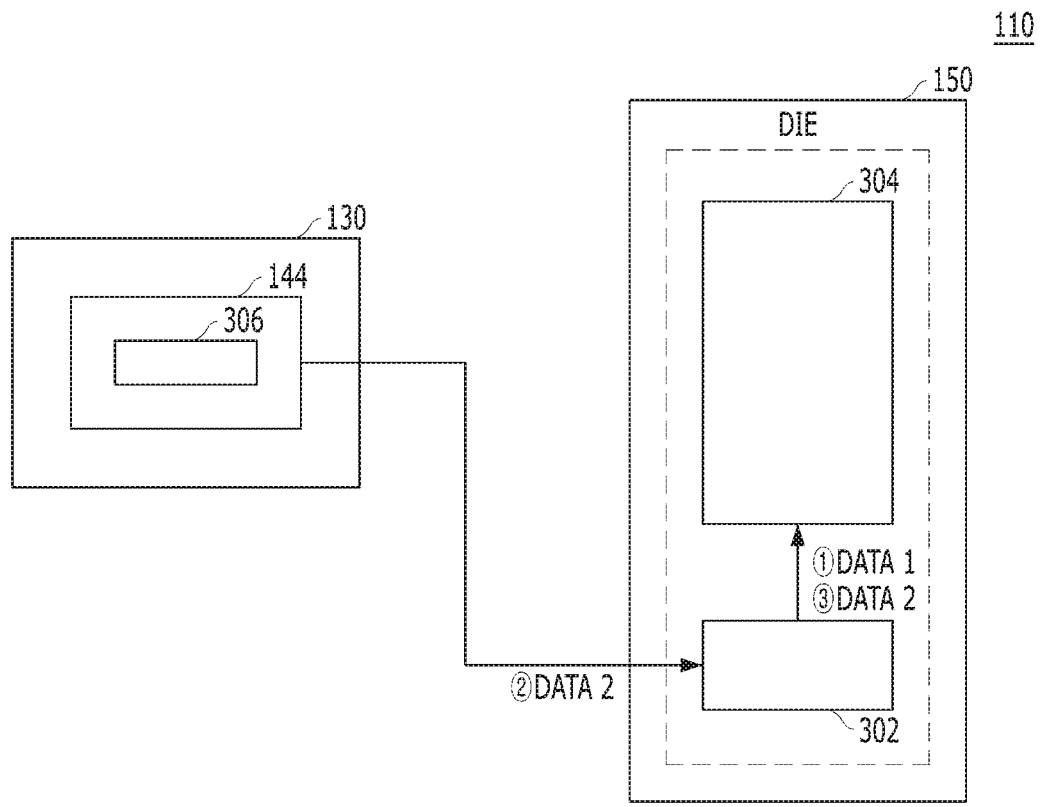
FIGS. 3A and 3B illustrate a cache program operation.

FIGS. 3A and 3B illustrate a concept of a cache program operation.

FIG. 3A schematically shows only the essential constituent elements that are required to describe a cache program operation in the data processing system 100 of FIG. 1.

Referring to FIG. 3A, when plural pieces of data are programmed in a memory block 304 included in a memory die DIE according to a cache program operation, the controller 130 may provide the memory device 150 with a second data DATA2 that is buffered in the write buffer 306 while the memory device 150 performs a first program operation of programming a first data DATA1 that is buffered in the page buffer 302 into the memory block 304. The controller 130 may control the memory device 150 to buffer the provided second data DATA2 in the page buffer 302 while the first program operation is performed. The controller 130 may control the memory device 150 to perform a second program operation to program the second data DATA2 buffered in the page buffer 302 into the memory block 304 as soon as the first program operation is completed.

When a plural piece of data are programmed in a memory block according to a normal program operation, the controller 130 may provide the memory device 150 with the second data buffered in the write buffer only when the first program operation is successfully performed. Conversely, when the data are programmed in the memory block 304 according to the cache program operation, the controller 130 may provide the memory device 150 with the second data buffered in the write buffer while the first program operation is performed, regardless of whether the first program operation is of a success or not.

The controller 130 may provide the memory device 150 with the second data and performing an operation of buffering the second data in the page buffer while the first program operation is being performed by using a pipelining scheme. Therefore, when plural pieces of data are programmed in a memory block, the cache program operation may provide a higher program speed as compared with a normal program operation.

FIG. 3B illustrates a pipelining scheme of a cache program operation.

Referring to FIG. 3B, the controller 130 may provide the memory device 150 with a first data which is buffered in the write buffer 306 at the beginning of a cache program operation and control the memory device 150 to perform a first data input operation of buffering the first data in the page buffer 302. The controller 130 may control the memory device 150 to perform a first program operation in which the memory device 150 programs the first data buffered in the page buffer 302 into the memory block 304. The time T_PGM1 taken for completing the first program operation may be much longer than the time T_1 taken for completing the first data input operation.

The controller 130 may provide the memory device 150 with a second data which is buffered in the write buffer 306 during the first program operation and control the memory device 150 to perform a second data input operation of buffering the second data in the page buffer 302. Since the time T_2 taken for completing the second data input operation is much shorter than the time T_PGM1 taken for completing the first program operation, the controller 130 may complete the second data input operation while the first program operation is performed.

The controller 130 may not reserve time for performing the data input operation by performing a cache program operation on the data based on the pipelining scheme in which a data input operation is performed on the subsequent data, i.e., the second data, while a program operation is being performed on the current data, i.e., the first data. Therefore, when a cache program operation is performed on high-capacity data, the speed of a program operation may be improved compared with a normal program operation.

In the case of the cache program operation, the controller 130 may control the memory device 150 to perform a data input operation for the second data during the first program operation and perform the second program operation immediately after the first program operation is completed. The controller 130 may control the memory device 150 to determine whether the first program operation is a success or not while the second program operation is performed. Therefore, the time T_VF1 required to determine whether the first program operation is a success or not may overlap with the time T_PGM2 required to perform the second program operation. The controller 130 may control the memory device 150 to perform an error handling operation for the first data when the first program operation is a failure. The error handling operation may be an operation of copying valid data stored in a first memory block on which the first program operation is performed into a second memory block, which is a normal block, and then programming the first data back into the second memory block by using the first data buffered in the write buffer 306.

In the case of a normal program operation, a data input operation for the second data may be performed only after the error handling operation for the first data is completed. In the case of a cache program operation, however, the memory device 150 may have completed the second program operation at the moment when the error handling operation for the first data begins. When the first program operation is a failure while a cache program operation is performed, the controller 130 may control the memory device 150 to perform an error handling operation not only for the first data but also for the second data as well, regardless of whether the second program operation is a success or not.

For example, when the logical block addresses (LBA) corresponding to the first data and the second data are the same and the first program operation is a failure while the second program operation is a success and when the memory device 150 does not perform an error handling operation for the first data while not performing the error handling operation for the second data, the memory device 150 may program the first data posterior to the second data that is the latest data. Accordingly, the controller 130 may determine the first data that is physically most lastly programmed as the latest data for the logical address, which is problematic.

Therefore, in the case of the cache program operation, the first program operation for the first memory block may fail, and even when the second program operation performed for the first memory block after the first program operation is a success, the controller 130 may control the memory device 150 to perform not only an error handling operation for the first data but also an error handling operation for the second data as well. In order to perform an error handling operation for the first data and the second data, the controller 130 may have to provide the memory device 150 with the first data and the second data that are buffered in the write buffer 306. Whether or not the first data and the second data are buffered in the write buffer 306 at the moment when an error handling operation for the first data and the second data is to be performed may be different according to a method of buffering the data provided from the host 102 in the write buffer 306 and deleting the normally programmed data from the write buffer 306 (which is, hereinafter, referred to as a method of operating the write buffer 306).

The method of operating the write buffer 306 may include a ring buffer scheme and a scatter-gather scheme. In both of the ring buffer scheme and the scatter-gather scheme, the program-failed data may not be deleted from the write buffer 306. Accordingly, when the second program operation is a success while the first program operation is a failure, regardless of the method of operating the write buffer 306, the first data may remain in the write buffer 306 at the moment when the error handling operation for the first data begins. However, in the case of the second data that is normally programmed, whether or not the second data remains in the write buffer 306 at the moment when the error handling operation for the second data begins may be different according to the method of operating the write buffer 306. As will be described later, in the case of the scatter-gather scheme, the controller 130 may delete normally programmed data from the write buffer. Therefore, when the first program operation is a failure and the second program operation is a success during a cache program operation, only the first data may remain in the write buffer and the second data may not exist in the write buffer at the moment of the error handling operation, which is problematic.

Figure 4:
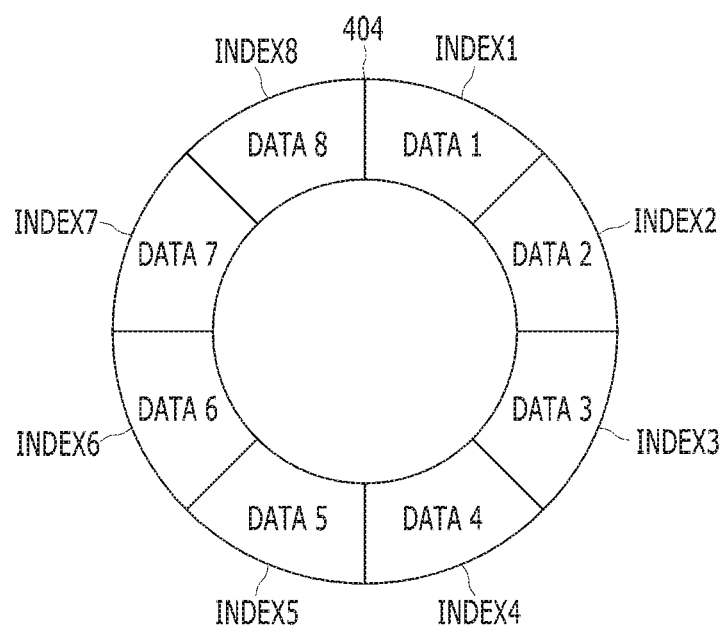
FIG. 4 illustrates a method of operating a write buffer according to a ring buffer method.

FIG. 4 illustrates a method of operating a write buffer according to a ring buffer method.

FIG. 4 illustrates a ring buffer 404 and a table 402 showing the state of the ring buffer 404. For the sake of convenience in description, the ring buffer 404 is formed of regions respectively corresponding to the first to eighth indices INDEX1 to INDEX8 and the controller 130 sequentially buffers first to eighth data DATA1 to DATA8 in the ring buffer 404.

As described above, the controller 130 may include the write buffer 306. The write buffer 306 may temporarily store the data corresponding to a program command provided from the host 102 before programming the data in a memory block. The ring buffer 404 may refer to the write buffer 306 for buffering data in the ring buffer scheme. The controller 130 may divide the area of the ring buffer 404 into regions and mark each of the divided regions with an index INDEX. The controller 130 may store status information STATUS representing whether data are buffered in a region corresponding to the index INDEX and data information DATA on the data buffered in the region corresponding to the index INDEX in the table 402. For example, the controller 130 may record a value of '1' in the status information STATUS when data are buffered in a region corresponding to a particular index INDEX and record a value of '0' in the opposite case.

Referring to the ring buffer 404 and the table 402 shown in FIG. 4, since the regions respectively corresponding to the first to eighth indices INDEX1 to INDEX8 of the write buffer 404 are buffering the first to eighth data DATA1 to DATA8, the controller 130 may record a value of '1' in all of the status information STATUS for the first to eighth indices INDEX1 to INDEX8. Also, the controller 130 may write the data information DATA for the first to eighth indices INDEX1 to INDEX8 as the first to eighth data DATA1 to DATA8, respectively.

When the memory device 150 normally programs the data buffered in the ring buffer 404 in a memory block, the controller 130 may delete the buffered data from the ring buffer 404. However, the controller 130 may delete the buffered data from the ring buffer 404 in the order that the data are buffered in the ring buffer 404. When the controller 130 sequentially buffers the first to eighth data DATA1 to DATA8 in the regions corresponding to the first to eighth indices INDEX1 to INDEX8 of the ring buffer 404 and the second data DATA2 buffered in the ring buffer 404 is normally programmed in a memory block, the controller 130 may not delete the first data DATA1 as well as the second data DATA2 from the ring buffer 404 if the program operation fails for the first data DATA1 which is buffered prior to the second data DATA2 in the ring buffer 404.

FIGS. 5A to 5C illustrate a method of operating a write buffer according to a scatter-gather buffer scheme.

FIG. 5A shows a scatter-gather buffer 502 and a table 504 for representing the status of the scatter-gather buffer 502. For the sake of convenience in description, the scatter-gather buffer 502 is formed of regions respectively corresponding to the first to eighth indices INDEX1 to INDEX8 and the controller 130 sequentially buffers the first to eighth data DATA1 to DATA8 buffered in the scatter-gather buffer 502.

Just like the ring buffer scheme described above with reference to FIG. 4, the controller 130 may divide the area of the scatter-gather buffer 502 into regions and mark each of the divided regions with an index INDEX. The controller 130 may store status information STATUS representing whether data are buffered in a region corresponding to the index INDEX and data information DATA on the data buffered in the region corresponding to the index INDEX in the table 504. For example, the controller 130 may record a value of '1' in the status information STATUS when data are buffered in a region corresponding to a particular index INDEX. The scatter-gather buffer 502 may refer to the write buffer 306 operated with the scatter-gather scheme.

Referring to FIG. 5A, the controller 130 may buffer the first to eighth data DATA1 to DATA8 in the regions respectively corresponding to the first to eighth indices INDEX1 to INDEX8 of the scatter-gather buffer 502, and then record a value of '1' in all of the status information STATUS of the table 504 respectively corresponding to the first to eighth indices INDEX1 to INDEX8. Also, the controller 130 may record the data buffered in the regions respectively corresponding to the first to eighth indices INDEX1 to INDEX8 of the scatter-gather buffer 502 into the data information DATA of the table 504 corresponding to the first to eighth indices INDEX1 to INDEX8.

FIG. 5B shows a scatter-gather buffer 506 and a table 508 after normally performing a program operation for the data buffered in the scatter-gather buffer.

When the memory device 150 normally programs the data buffered in the scatter-gather buffer 506 into a memory block regardless of the order that the data are buffered in the scatter-gather buffer 506, which is different from the ring buffer scheme, the controller 130 may delete the data from the scatter-gather buffer 506.

Referring to FIG. 5B, when the program operation for the first data DATA1 buffered in the region corresponding to the first index INDEX1 of the scatter-gather buffer 502 is a failure and the program operation for the second data DATA2 buffered in the region corresponding to the eighth index INDEX8 of the scatter-gather buffer 502 is a success, the controller 130 may delete the second data DATA2 which is buffered later than the first data DATA1 from the scatter-gather buffer 506 and the first data DATA1 may remain in the scatter-gather buffer 506. The controller 130 may change the status information STATUS corresponding to the eighth index INDEX8 into a value of '0' in the table 504 and then change the data information DATA corresponding to the eighth index INDEX8 into a null value.

FIG. 5C illustrates a scatter gather buffer 510 and a table 512 after buffering new data provided from the host after deleting the data buffered in a scatter-gather buffer.

The controller 130 may delete the second data DATA2 from the scatter-gather buffer 510 and then buffer a ninth data DATA9, which is a new data provided from the host 102, in the region corresponding to the eighth index INDEX8 of the scatter-gather buffer 510. The controller 130 may update the table 512 by changing the data information DATA corresponding to the eighth index INDEX8 into the ninth data DATA9 in the table 512 and changing the status information STATUS corresponding to the eighth index INDEX8 back into the value of '1'.

In the case of the ring buffer scheme, the controller 130 may not delete a subsequent data buffered in the ring buffer 404 from the ring buffer 404 even though a program operation for the subsequent data buffered in the ring buffer 404 is normally performed, until the data buffered first in the ring buffer 404 is successfully programmed. Therefore, when the controller 130 cannot create a new empty space in the ring buffer 404 because the subsequent data remains in the ring buffer 404, the controller 130 may not buffer new data provided from the host 102. According to the ring buffer scheme, when the capacity of the write buffer is small, the controller 130 may not buffer the new data provided from the host 102 into the ring buffer 404 until the data that is buffered first in the ring buffer 404 is successfully programmed. This may cause a problem in that the speed of a program operation is deteriorated.

On the other hand, in the case of the scatter-gather scheme, the controller 130 may delete the data that is normally programmed among the data buffered in the scatter-gather buffer 502 from the scatter-gather buffer 502, regardless of the order that data are buffered in the scatter-gather buffer 502. The controller 130 may buffer the data provided from the host 102 in the empty space which is created by deleting data from the scatter-gather buffer 502.

The size of the write buffer 306 is required to be reduced in accordance with the recent trend of miniaturized size of portable storage devices. When the size of the write buffer 306 is reduced and thus data of a sufficient size cannot be buffered in the write buffer 306 at one time, the scatter-gather scheme may provide an improved program operation speed as compared to the ring buffer scheme. The controller 130 may control the memory device 150 to cache program the data buffered in the write buffer 306 in a memory block as well as operating the write buffer 306 according to the scatter-gather scheme. When the first program operation is a failure while the second program operation is a success, an error handling operation for the second data may not be performed, which is problematic.

Figure 6A:
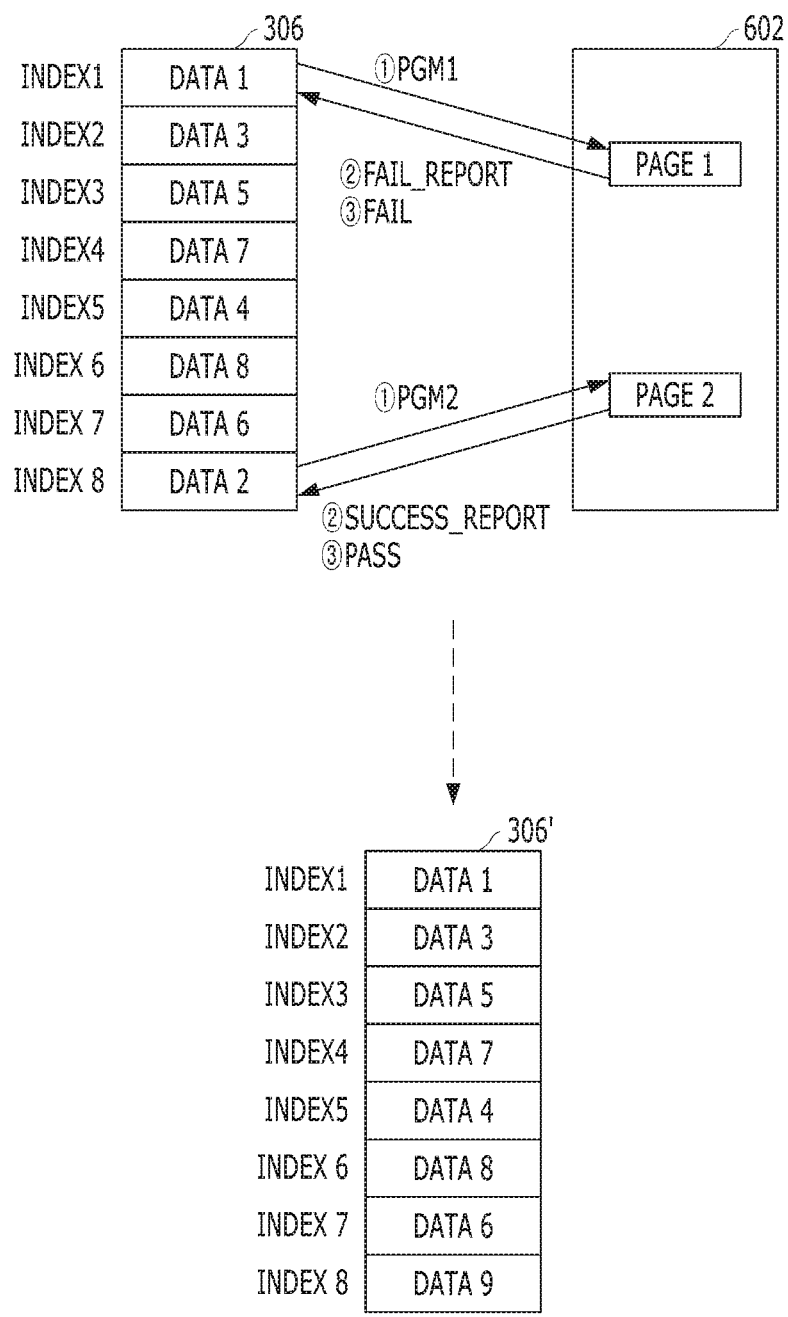
FIG. 6A illustrates a problem occurring when a cache program operation is performed while using a scatter-gather scheme.

FIG. 6A illustrates a problem occurring when a cache program operation is performed while using a scatter-gather scheme.

As described above, in the case of a cache program operation, the controller 130 may control the memory device 150 to simultaneously perform a program operation on data twice as much as the size of a page.

Referring to FIG. 6A, the controller 130 may provide the memory device 150 with the second data DATA2 buffered in the write buffer 306 while the memory device 150 performs a first program operation PGM1 of programming the first data DATA1 into a first page PAGE1 of the memory block 602, and the controller 130 may control the memory device 150 to perform a second program operation PGM2 of programming the second data DATA2 into a second page PAGE2 of the memory block 602 right after the first program operation PGM1 is completed.

When the first program operation PGM1 is a failure and the second program operation PGM2 is a success, the memory device 150 may provide the controller 130 with a failure signal FAIL_REPORT for the first program operation PGM1 and a success signal SUCCESS_REPORT for the second program operation PGM2. The controller 130 may determine the first program operation PGM1 and the second program operation PGM2 as failure FAIL or pass PASS in response to the provided failure signal FAIL_REPORT and the success signal SUCCESS_REPORT.

According to the scatter-gather scheme, when the first program operation PGM1 is a failure with the first data DATA1 and the second program operation PGM2 is a success with the second data DATA2, the controller 130 may buffer the new data DATA9 provided from the host 102 in the area INDEX8 corresponding to the second data DATA2 of the buffer 306' by retaining the first data DATA1 buffered in the write buffer 306' and deleting the second data DATA2 from the write buffer 306'.

As described above, in the case of a cache program, when the first program operation PGM1 is a failure with the first data DATA1, the controller 130 may control the memory device 150 to perform an error handling operation for both of the first data DATA1 and the second data DATA2, regardless of whether the second program operation PGM2 is a success or not with the second data DATA2. According to the scatter-gather scheme, during the time when an error handling operation is performed, the controller 130 may perform an error handling operation for the first data DATA1 and may not be able to perform an error handling operation for the second data and DATA2 because the second data DATA2 is already deleted from the write buffer 306' and the new data DATA9 provided from the host 102 is already buffered in the write buffer 306'.

Figure 6B:
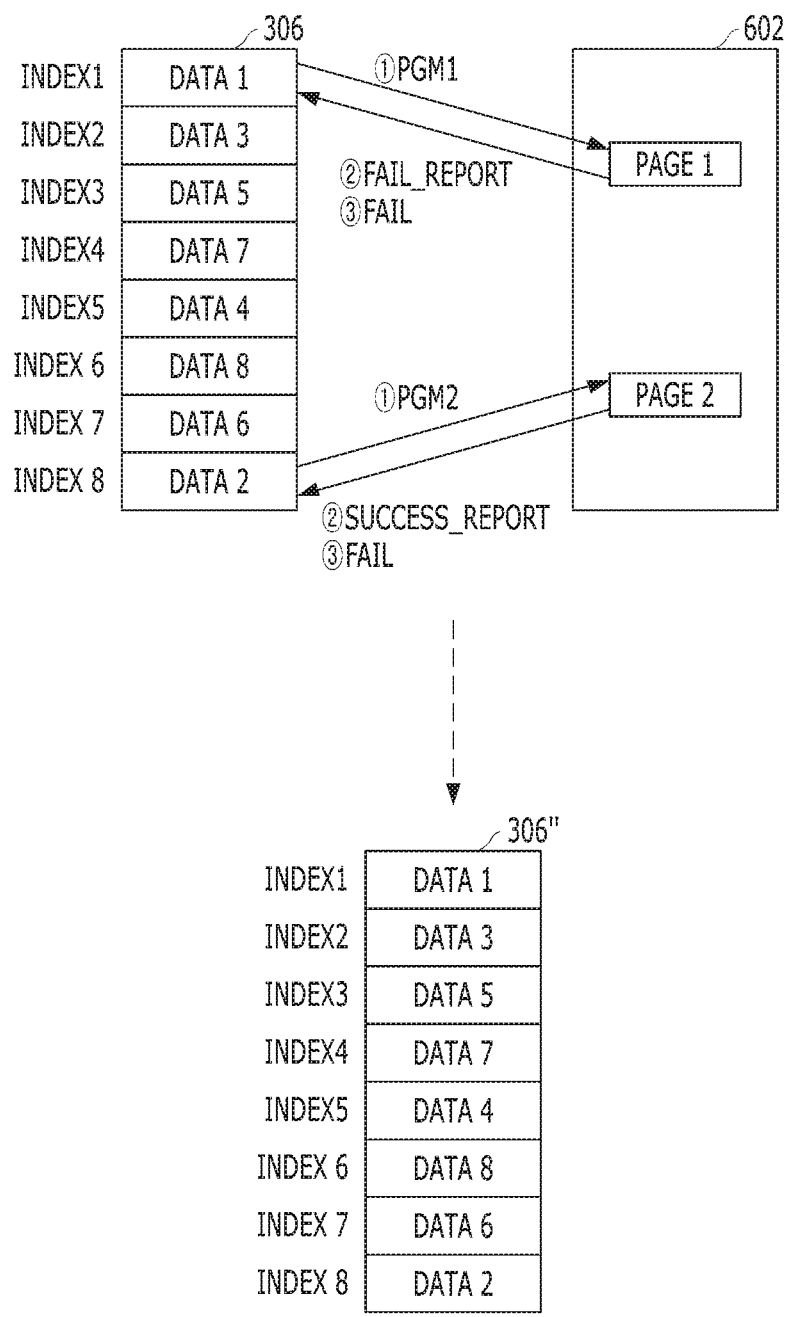
FIG. 6B illustrates a method of operating a write buffer in accordance with an embodiment of the present invention.

FIG. 6B illustrates a method of operating a write buffer according to an embodiment of the present invention.

According to the embodiment of the present invention, when the second program operation PGM2, which is performed following the first program operation PGM1, is a success after the first program operation PGM1 is a failure in the middle of performing a cache program operation while operating the write buffer 306 based on the scatter-gather scheme simultaneously, the controller 130 may force the second program operation PGM2 to fail. When the first program operation PGM1 is a failure, the controller 130 may force the second program operation PGM2 to fail even though the second program operation PGM2 is a success. In this way, the second data DATA2 may remain in the write buffer 306. Therefore, the controller 130 may control the memory device 150 to perform an error handling operation by using the first data DATA1 and the second data DATA2 remaining in the write buffer 306.

Referring to FIG. 6B, when the first program operation PGM1 is a failure and the second program operation PGM2 is a success, the memory device 150 may provide the controller 130 with a failure signal FAIL_REPORT for the first program operation PGM1 and a success signal SUCCESS_REPORT for the second program operation PGM2. The controller 130 may force the second program operation PGM2 to fail with the second data DATA2 in response to the provided failure signal FAIL_REPORT (indicating the failure of the first program operation PGM1 with the first data DATA1) and the provided success signal SUCCESS_REPORT (indicating the success of the second program operation PGM2 with the second data DATA2).

When the second program operation PGM2 is forcibly processed as a failure with the second data DATA2 due to the failure of the first program operation PGM1 with the first data DATA1, the controller 130 may retain all the first and second data DATA1 and DATA2 that are buffered in a write buffer 306" based on the scatter-gather scheme and may not be provided with additional data from the host 102. According to the embodiment of the present invention, since all the first and second data DATA1 and DATA2 exist in the write buffer 306" at the moment when an error handling operation for the first and second data DATA1 and DATA2 is to be performed, the controller 130 may control the memory device 150 to perform an error handling operation not only for the first data DATA1 but also for the second data DATA2.

Figure 7:
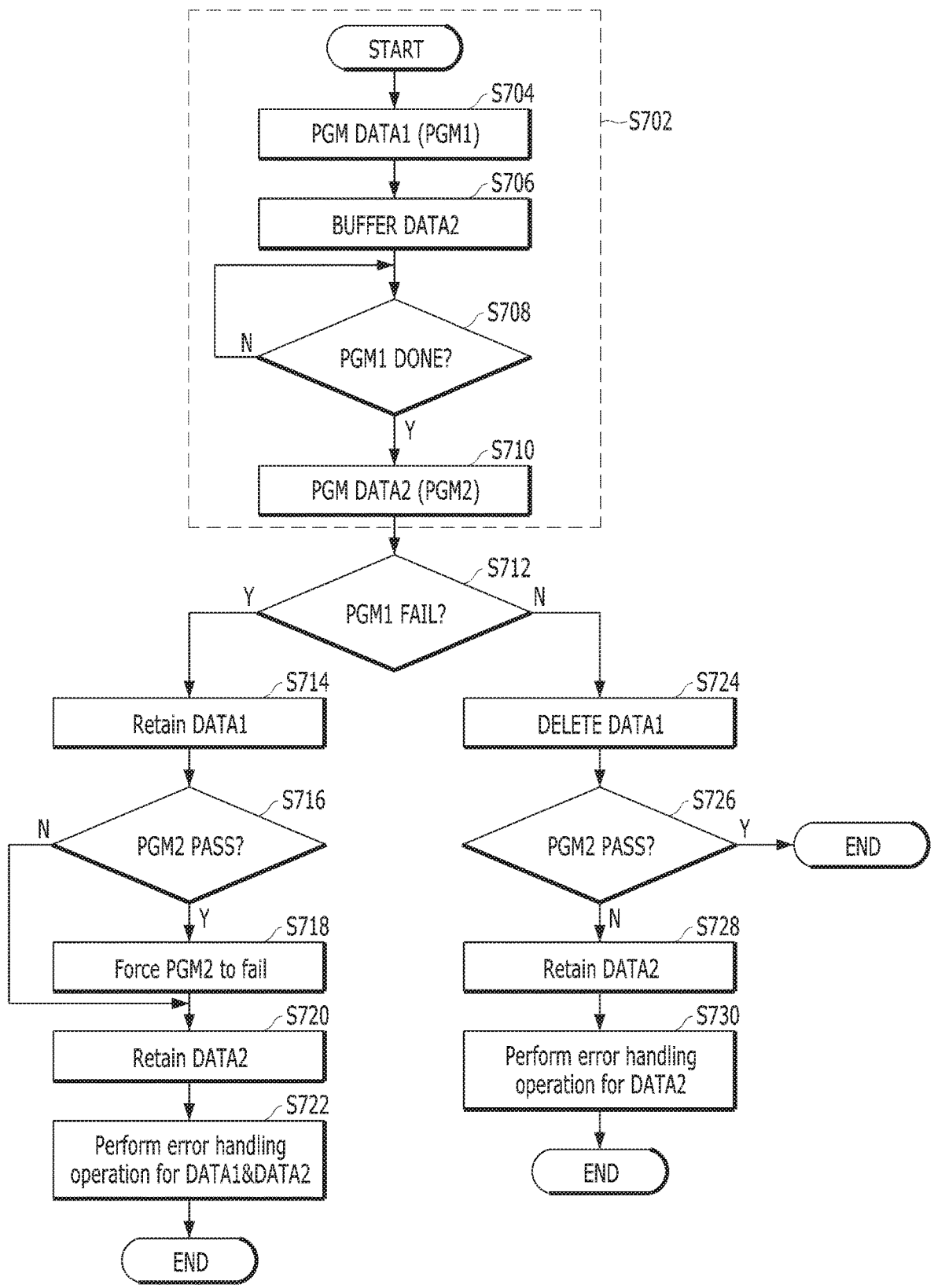
FIG. 7 is a flowchart describing an operation of a memory system 110 in accordance with an embodiment of the present invention.

FIG. 7 is a flowchart describing an operation of a memory system 110 in accordance with an embodiment of the present invention.

In step S702, the controller 130 may control the memory device 150 to perform a cache program operation with plural pieces of data (e.g., first and second data DATA1 and DATA2) on a memory block. As described above with reference to FIGS. 3A and 3B, the controller 130 may control the memory device 150 to perform a cache program operation with the first and second data DATA1 and DATA2 based on a pipelining scheme in which the memory device 150 buffers the second data DATA2 which is buffered in the write buffer 306 in a page buffer during the first program operation PGM1 with the first data DATA1. The operation (the step S702) of performing the cache program operation may include performing a first program operation PGM1 (step S704), buffering the second data DATA2 in the page buffer while the first program operation PGM1 is being performed with the first data DATA1 (step S706), determining whether the first program operation PGM1 is completed or not (step S708), and performing a second program operation PGM2 with the second data DATA2 right after the first program operation PGM1 is completed with the first data DATA1 (step S710).

In step S704, the controller 130 may control the memory device 150 to perform a first program operation PGM1 with the first data DATA1. The controller 130 may provide the memory device 150 with the first data DATA1 by buffering the first data DATA1 provided from the host 102 in the write buffer 306. The memory device 150 may program the first data DATA1 into the memory block (the first program operation PGM1) after buffering the provided first data DATA1 in the page buffer. The controller 130 may buffer the data provided from the host 102 in the write buffer 306 and delete the programmed data from the write buffer 306 based on the scatter-gather scheme which is described above with reference to FIG. 5.

In step S706, the controller 130 may control the memory device 150 to buffer the second data DATA2 in the page buffer while performing the first program operation PGM1 with the first data DATA1 in the step S704. The controller 130 may provide the memory device 150 with the second data DATA2 buffered in the write buffer 306 while the first program operation PGM1 is being performed with the first data DATA1 in the step S704, and buffer the provided second data DATA2 in the page buffer. In the case of the cache program operation, unlike a normal program operation, the controller 130 may not provide the memory device 150 with the second data DATA2 only when the first program operation PGM1 succeeds, but may provide the memory device 150 with the second data DATA2 while the first program operation PGM1 is being performed.

In step S708, the controller 130 may check whether or not the first program operation PGM1 is completed with the first data DATA1. When the first program operation PGM1 is not completed yet ('N' in the step S708), the controller 130 may control the memory device 150 to continue to perform the first program operation PGM1 with the first data DATA1 until the first program operation PGM1 is completed with the first data DATA1. The time required to complete the first program operation PGM1 may be longer than a sum of the time taken for the controller 130 to provide the memory device 150 with the second data DATA2 and the time the time taken for the memory device 150 to buffer the second data DATA2 in the page buffer.

In step S710, when the first program operation PGM1 is completed ('Y' in the step S708), the controller 130 may control the memory device 150 to perform a second program operation PGM2 for is programming the second data DATA2 buffered in the page buffer into a memory block.

The controller 130 may quickly program plural pieces of data by controlling the memory device 150 to perform a second program operation PGM2 with the second data DATA2 right after the memory device 150 completes the first program operation PGM1 with the first data DATA1 according to the cache program operation.

In step S712, the controller 130 may determine whether or not the first program operation PGM1 performed with the first data DATA1 in the step S704 is a failure. When the first program operation PGM1 is a failure with the first data DATA1, the controller 130 may control the memory device 150 to perform an error handling operation for the first data DATA1. When the first program operation PGM1 is a success with the first data DATA1, the controller 130 may control the memory device 150 to complete the first program operation PGM1 with the first data DATA1 and to perform a program operation with the second data DATA2.

In step S714, when the first program operation PGM1 is a failure ('Y' in the step S712), the controller 130 may retain the first data DATA1 in the write buffer 306 due to the failure of the first program operation PGM1. According to the embodiment of the present invention, when the program operation is a failure under the scatter-gather scheme, the controller 130 may control the memory device 150 to perform an error handling operation for the data by retaining the data buffered in the write buffer 306 and using the buffered data.

In step S716, the controller 130 may determine whether or not the second program operation PGM2 performed in the step S710 is a failure with the second data DATA2. When the first program operation PGM1 is a failure with the first data DATA1 while the cache program operation is performed ('Y' in the step S712), the controller 130 may control the memory device 150 to perform an error handling operation not only for the first data DATA1 but also for the second data DATA2 regardless of whether the second program operation PGM2 is a success or not with the second data DATA2. As described above, when the logical addresses of the first data DATA1 and the second data DATA2 are the same and the error handling operation is performed only for the first data DATA1, which is an old data, the first data DATA1 is programmed physically later than the second data DATA2, which is the latest data. Therefore, the controller 130 may have to additionally perform an operation of discriminating the latest data corresponding to the logical address, which is problematic. Therefore, even when the second program operation PGM2 is a success, the controller 130 may need to keep the second data DATA2 in the write buffer 306 to perform an error handling operation for the second data DATA2.

In step S718, when the first program operation PGM1 is a failure with the first data DATA1 and the second program operation PGM2 is a success with the second data DATA2 ('Y' in the step S712 and 'Y' in the step S716), the controller 130 may force the second program operation PGM2 to fail with the second data DATA2. According to the embodiment of the present invention, the controller 130 may retain the second data DATA2 in the write buffer 306 by forcing the second program operation PGM2 to fail with the second data DATA2 in order to perform an error handling operation for the second data DATA2 while operating the write buffer 306 at the same time based on the scatter-gather scheme.

As described above with reference to FIG. 5, according to the scatter-gather scheme, when the controller 130 passes a program operation for certain data, the controller 130 may delete the data from the write buffer 306 and buffer a new data provided from the host 102 in the empty area of the write buffer 306 which is created as a result of the deletion of the data. When the controller 130 operating the write buffer 306 based on the scatter-gather scheme passes the second program operation PGM2 with the second data DATA2, the controller 130 may delete the second data DATA2 from the write buffer 306.

In order for the controller 130 to perform an error handling operation for the second data DATA2, the second data DATA2 programmed in a memory block might be read and re-programmed. However, since the memory block is the one in which the first program operation PGM1 has failed right before the second program operation PGM2 is performed, this memory block is highly likely to be an abnormal memory block. Therefore, since the reliability of the second data DATA2 read from the memory block is not dependable even when the second program operation PGM2 is determined as passed with the second data DATA2, the controller 130 may retain the second data DATA2 in the write buffer 306 based on the scatter-gather scheme by forcing the second program operation PGM2 to fail.

In step S720, when the second program operation PGM2 is a failure with the second data DATA2 ('N' in the step S716), the controller 130 may force the second program operation PGM2 to fail and retain the second data DATA2 in the write buffer 306 based on the scatter-gather scheme.

In step S722, the controller 130 may control the memory device 150 to perform an error handling operation for the first and second data DATA1 and DATA2. The controller 130 may provide the memory device 150 with the first and second data DATA1 and DATA2 that are buffered in the write buffer 306 and control the memory device 150 to perform the error handling operation of re-programing the provided first and second data DATA1 and DATA2 into a new normal memory block. The controller 130 may copy the valid data programmed in the memory block in which the first program operation PGM1 has been performed into the new normal memory block before the memory device 150 performs the first program operation PGM1, and process the memory block in which the first is program operation PGM1 has been performed as a bad block.

When the first program operation PGM1 is a success in the step S724 ('N' in the step S712), the controller 130 may delete the first data DATA1 from the write buffer 306. The controller 130 may buffer a new data provided from the host 102 in the empty space of the write buffer 306 which is created by deleting the first data DATA1.

In step S726, the controller 130 may check whether or not the second program operation PGM2 is a success with the second data DATA2. When the second program operation PGM2 is a success ('Y' in the step S726), the controller 130 may delete the second data DATA2 from the write buffer 306, and control the memory device 150 to continue to perform a subsequent program operation.

In step S728, when the second program operation PGM2 is a failure with the second data DATA2 ('N' in the step S726), the controller 130 may force the second program operation PGM2 to fail and retain the second data DATA2 in the write buffer 306.

In step S730, the controller 130 may control the memory device 150 to perform an error handling operation for the second data DATA2. The controller 130 may provide the memory device 150 with the second data DATA2 which is buffered in the write buffer 306 and control the memory device 150 to perform an error handling operation of re-programming the provided second data DATA2 into a new normal memory block.

According to one embodiment of the present invention, even when the write buffer 306 operates based on the scatter-gather scheme and even when the first program operation PGM1 is a failure with the first data DATA1 during a cache program operation and the second program operation PGM2 is a success with the second data DATA2, the controller 130 may retain the second data DATA2 in the write buffer 306 by forcing the second program operation PGM2 to fail. Therefore, the controller 130 may control the memory device 150 to perform an error handling operation for the first and second data DATA1 and DATA2 by using the first and second data DATA1 and DATA2 that are buffered in the write buffer 306. Therefore, as the write buffer 306 operates based on the scatter-gather scheme, the speed of a program operation may be improved by performing a cache program operation while using the write buffer 306 of a small capacity at the same time.

FIG. 8 is a block diagram illustrating the memory system 110 in accordance with an embodiment of the present invention. FIG. 8 schematically shows only the constituent elements related to the present invention in the data processing system 100 of FIG. 1.

The controller 130 may include a program managing unit 810, a failure processing unit 804, a buffer managing unit 806, an error handling unit 808, and a memory 144. The program managing unit 810 may include a cache program manager 802, and the memory 144 may include a write buffer 306.

The memory device 150 may include memory blocks 852 and 862 and page buffers 854 and 864.

The memory device 150 may perform the operations of the steps S704, S710, S716, and S726 that are described above with reference to FIG. 7. Specifically, the memory device 150 may perform a program operation under the control of the controller 130, determine whether the program operation is a success or not, and transfer a success report or a failure report to the controller 130.

The cache program manager 802 may perform the operation of the step S702, which is described earlier with reference to FIG. 7. The cache program manager 802 may control the memory device 150 to perform a cache program operation. As described above with reference to FIGS. 3A and 3B, the cache program manager 802 may provide the memory device 150 with the second data DATA2 which is buffered in the write buffer 306 while the first program operation PGM1 is being performed with the first data DATA1. The cache program manager 802 may control the memory device 150 to buffer the provided second data DATA2 in a page buffer 854 while the first program operation PGM1 is being performed with the first data DATA1. The cache program manager 802 may control the memory device 150 to program the second data DATA2 into the memory block 852 right after the first program operation PGM1 is completed with the first data DATA1. The cache program manager 802 may provide the failure processing unit 804 with information INFO_CP_PF about whether the cache program operation of the memory device 150 is a success or not.

The failure processing unit 804 may perform the operations of the steps S714, S718, S724, and S728 that are described above with reference to FIG. 7. The failure processing unit 804 may forcibly process a program operation as failure based on the information INFO_CP_PF about whether the provided cache program operation is a success or not. According to the embodiment of the present invention, when the first program operation PGM1 is a failure with the first data DATA1 while a cache program operation is performed, the failure processing unit 804 may force the second program operation PGM2 to fail with the second data DATA2 due to the failure of the first program operation PGM1 with the first data DATA1 even when the second program operation PGM2 is a success with the second data DATA2. The failure processing unit 804 may provide the buffer managing unit 806 with first failure information INFO_FAIL1, which is information on the program operation (e.g., the first program operation PGM1 and the second program operation PGM2) that is a failure while the cache program operation is performed.

According to the embodiment of the present invention, when the first program operation PGM1 is a failure with the first data DATA1 while a cache program operation is performed, the failure processing unit 804 may force the second program operation PGM2 to fail with the second data DATA2, regardless of whether the second program operation PGM2 is a success or not with the second data DATA2. Therefore, as will be described later, the buffer managing unit 806 may retain not only the first data DATA1 but also the second data DATA2 in the write buffer 306. The error handling unit 808 may also perform an error handling operation for a cache program operation as well as operating the write buffer based on the scatter-gather scheme by controlling the memory device 150 to perform an error handling operation by using the first and second data DATA1 and DATA2 that are buffered in the write buffer 306.

The buffer managing unit 806 may perform the operations of the steps S714, S720, S724, and S728 that are described above with reference to FIG. 7. As described earlier with reference to FIGS. 5A to 5C, the buffer managing unit 806 may buffer the data (e.g, the first data DATA1 and the second data DATA2) provided from the host 102 in the write buffer 306 based on the scatter-gather scheme, and delete the programmed data from the write buffer 306. As described earlier with reference to FIGS. 5A to 5C, according to the scatter-gather scheme, the buffer managing unit 806 may delete the data for the program operation which is a success from the write buffer 306, regardless of the order that the data are buffered in the write buffer 306. The buffer managing unit 806 may buffer new data provided from the host 102 in the empty space created by deleting the data. Also, the buffer managing unit 806 may retain the data (e.g., the first data DATA1 and the second data DATA2) for the program operation (e.g., the first program operation PGM1 and the second program operation PGM2) that is a failure by the failure processing unit 804. The buffer managing unit 806 may provide the error handling unit 808 with first data information INFO_DATA1, which is information on the data (e.g., the first data DATA1 and the second data DATA2) for the program operation (e.g., the first program operation PGM1 and the second program operation PGM2) that is a failure while the cache program operation is performed.

According to the embodiment of the present invention, when the first program operation PGM1 is a failure with the first data DATA1 while a cache program operation is performed, the failure processing unit 804 may force the second program operation PGM2 to fail with the second data DATA2, regardless of whether the second program operation PGM2 is a success or not with the second data DATA2. When the write buffer 306 operates based on the scatter-gather scheme and the failure processing unit 804 forces the second program operation PGM2 performed with the second data DATA2 during a cache program operation to fail based on the first failure information INFO_FAIL1 (indicating the failure of the first program operation PGM1 with the first data DATA1) provided from the failure processing unit 804, the buffer managing unit 806 may solve the problem of not performing an error handling operation for a cache program operation by retaining both of the first data DATA1 and the second data DATA2 in the write buffer 306.

The error handling unit 808 may perform the operations of the steps S722 and S730 that are described above with reference to FIG. 7. The error handling unit 808 may control the memory device 150 to perform an error handling operation based on the provided first data information INFO_DATA1. The error handling unit 808 may control the memory device 150 to perform an error handling operation for the data (e.g., the first data DATA1 and the second data DATA2) for the program operation (e.g., the first program operation PGM1 and the second program operation PGM2) that is a failure by providing the memory device 150 with the data from the write buffer 306. When the failure processing unit 804 forces the second program operation PGM2 performed with the second data DATA2 during a cache program operation to fail due to the failure of the first program operation PGM1 with the first data DATA1, the error handling unit 808 may control the memory device 150 to perform the error handling operation by programming the first and second data DATA1 and DATA2 buffered in the write buffer 306 into a new normal memory block 862, which is not the memory block 852 in which the first and second program operations PGM1 and PGM2 have been performed.

Figure 9A:
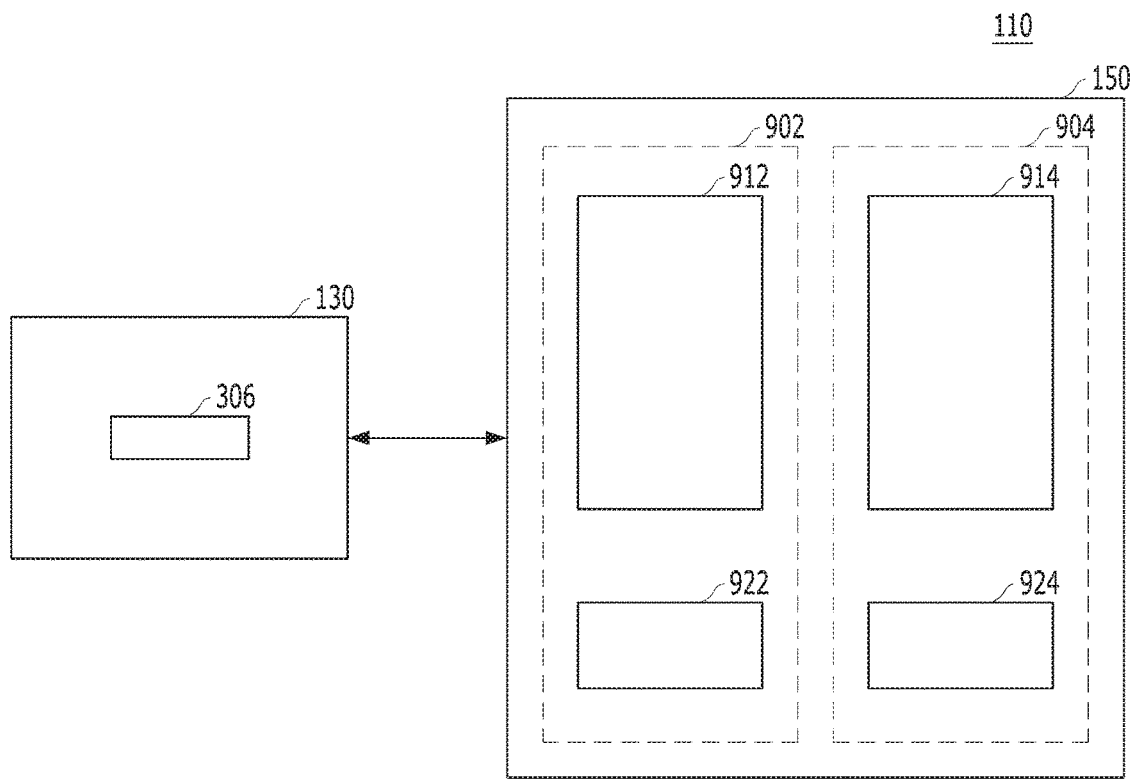
FIGS. 9A and 9B are diagrams illustrating a concept of an interleave program.
Figure 9B:
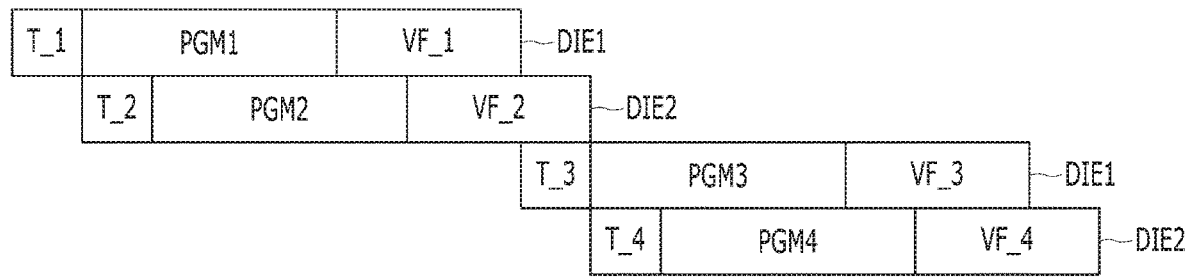

FIGS. 9A and 9B are diagrams illustrating an interleave program.

FIG. 9A schematically shows only essential constituent elements that are necessary for describing an interleave program operation in the data processing system 100 of FIG. 1.

The memory device 150 may include a first memory die 902 and a second memory die 904. The first memory die 902 may include a first memory block 912 and a first page buffer 922, and the second memory die 904 may include a second memory block 914 and a second page buffer 924.

The controller 130 may control the memory device 150 to simultaneously program plural pieces of data in the memory blocks included in each of a plurality of memory dies. The controller 130 may provide the memory device 150 with the first data DATA1 buffered in the write buffer 306 and control the memory device 150 to buffer the first data DATA1 in the first page buffer 922. The controller 130 may provide the memory device 150 with the second data DATA2 which is buffered in the write buffer 306 after providing the memory device 150 with the first data DATA1. The controller 130 may control the memory device 150 to perform a first program operation PGM1 of programing the first data DATA1 into the first memory block 912 after buffering the first data DATA1 in the first page buffer 922.

The controller 130 may control the memory device 150 to perform a second program operation PGM2 of programming the second data DATA2 in the second memory block 914 after the memory device 150 buffers the second data DATA2 into the second page buffer 924 while the first program operation PGM1 is being performed.

FIG. 9B is a timing diagram of an interleave program operation.

When plural pieces of data are programmed in memory blocks included in one memory die 150, the controller 130 may control the memory device 150 to perform a program operation for subsequent data after the program operation for the current data is completed. When plural pieces of data are programmed in memory blocks included not in one memory die but in memory blocks including at least one memory block included in each of a plurality of memory dies, the controller 130 may simultaneously perform program operations for plural pieces of data by controlling the memory device 150 to perform an interleave program operation for the plural pieces of data.

Referring to FIG. 9B, after the controller 130 performs a first data input operation T_1 of buffering a first data DATA1 in a page buffer included in a first memory die DIE1, the controller 130 may control the memory device 150 to perform a first program operation PGM1 for a memory block included in the first memory die DIE1. The controller 130 may control the memory device 150 to perform a second program operation PGM2 for a memory block included in a second memory die DIE2 after a second data input operation T_2 of buffering a second data DATA2 in a page buffer included in the second memory die DIE2 while the first program operation PGM1 is being performed.

When the first and second program operations PGM1 and PGM2 are completed, the controller 130 may control the memory device 150 to perform operations VF_1 and VF_2 for checking whether the first and second program operations PGM1 and PGM2 have succeeded or not. When the first and second program operations PGM1 and PGM2 have succeeded, the controller 130 may control the memory device 150 to perform an interleave program operation for third and fourth data. The controller 130 may control the memory device 150 to perform an interleave program operation in which the memory device 150 concurrently performs program operations for plural pieces of data in memory blocks included in different memory dies, thus improving the speed of a program operation.

Figure 10A:
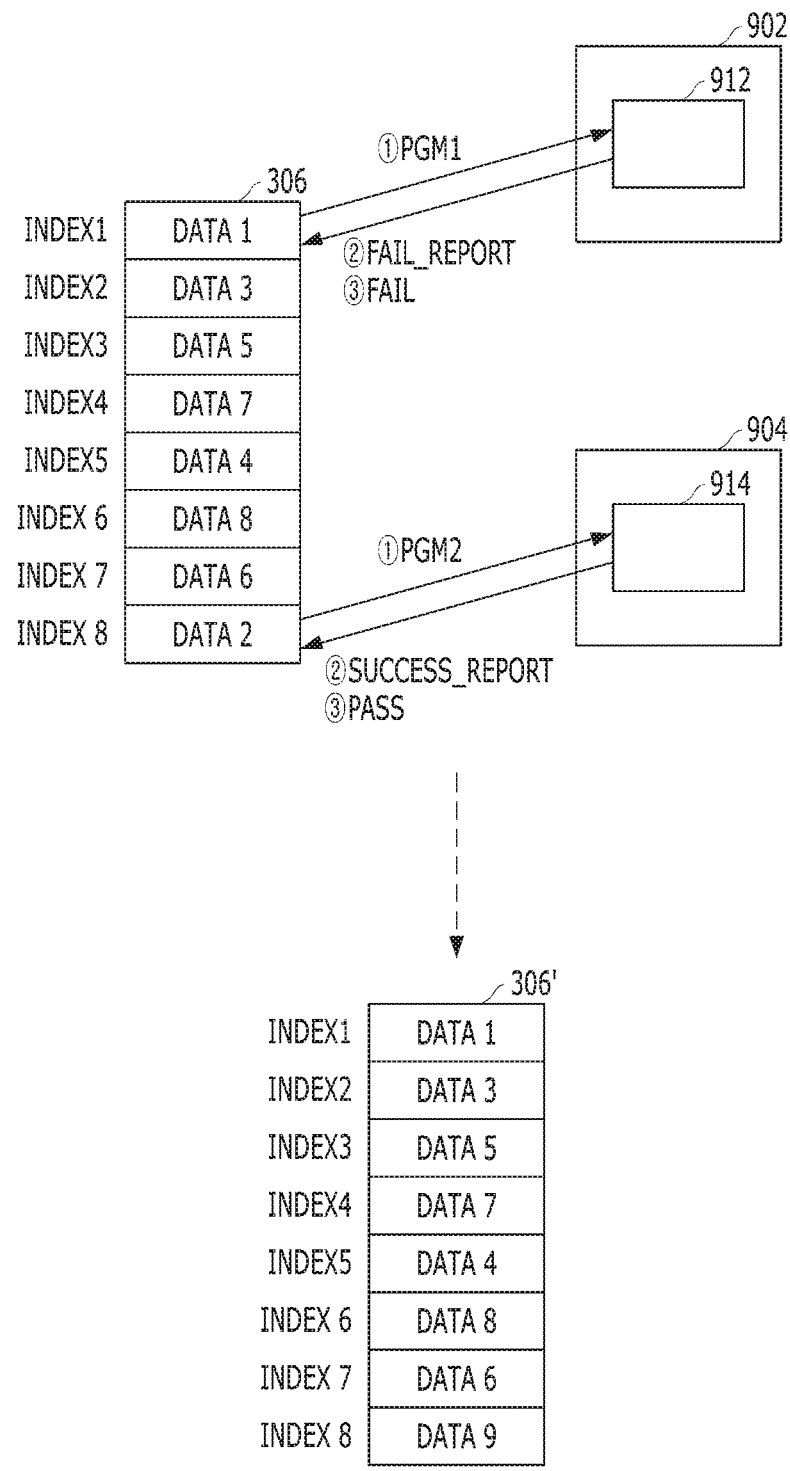
FIG. 10A is a diagram illustrating a problem occurring when an interleave program is performed while using a scatter-gather scheme.

FIG. 10A is a diagram illustrating a problem occurring when an interleave program operation is performed while using a scatter-gather scheme.

Similar to the error handling operation for a cache program operation which is described earlier, when the first program operation PGM1 is a failure during an interleave program operation, the controller 130 may control the memory device 150 to perform an error handling operation not only for the first data DATA1 but also for the second data DATA2 as well regardless of whether the second program operation PGM2 is a success or not.

For example, when the logical block addresses LBA corresponding to the first data DATA1 and the second data DATA2 are the same and the first program operation PGM1 is a failure while the second program operation PGM2 is a success, and when the memory device 150 performs an error handling operation only for the first data DATA1 and does not perform an error handling operation for the second data DATA2, the memory device 150 may program the first data DATA1 later than the second data DATA2, which is the latest data. As a result, there is a problem in that the controller 130 determines the first data DATA1 which is physically lastly programmed as the latest data for the logical address. Accordingly, just as in the cache program operation, in the case of an interleave program operation, when a first program operation PGM1 for a first memory block included in the first memory die is a failure and a second program operation PGM2 performed for a second memory block included in the second memory die after the first program operation PGM1 is a success, the controller 130 may control the memory device 150 to perform not only an error handling operation for the first data DATA1 but also an error handling operation for the second data DATA2 as well.

Referring to FIG. 10A, while the memory device 150 performs a first program operation PGM1 of programming the first data DATA1 in the first memory block 912 included in the first memory die 902, the controller 130 may provide the memory device 150 with the second data DATA2 buffered in the write buffer 306, and while the memory device 150 performs the first program operation PGM1, the controller 130 may control the memory device 150 to perform a second program operation PGM2 of programming the second data DATA2 in the second memory block 914 included in the second memory die 904.

When the first program operation PGM1 is a failure and the second program operation PGM2 is a success, the memory device 150 may provide the controller 130 with a failure signal FAIL_REPORT for the first program operation PGM1 and a success signal SUCCESS_REPORT for the second program operation PGM2.

According to the scatter-gather scheme, when the first program operation PGM1 is a failure with the first data DATA1 and the second program operation PGM2 is a success with the second data DATA2, the controller 130 may buffer a new data DATA9 provided from the host 102 in a region INDEX8 corresponding to the second data DATA2 of the write buffer 306' by retaining the first data DATA1 buffered in the write buffer 306' and deleting the second data DATA2 from the write buffer 306'.

As described above, in the case of the interleave program operation, the controller 130 may control the memory device 150 to perform an error handling operation not only for the first data DATA1 but also for the second data DATA2 performed when the first program operation PGM1 is a failure with the first data DATA1, regardless of whether the second program operation PGM2 is a success or not with the second data DATA2. According to the scatter-gather scheme, since the controller 130 has already deleted the second data DATA2 from the write buffer 306' and has buffered the new data DATA9 provided from the host 102 in the write buffer 306' at the moment when an error handling operation for the first data DATA1 and the second data DATA2 is performed, there is a problem in that the error handling operation for the second data DATA2 cannot be performed.

Figure 10B:
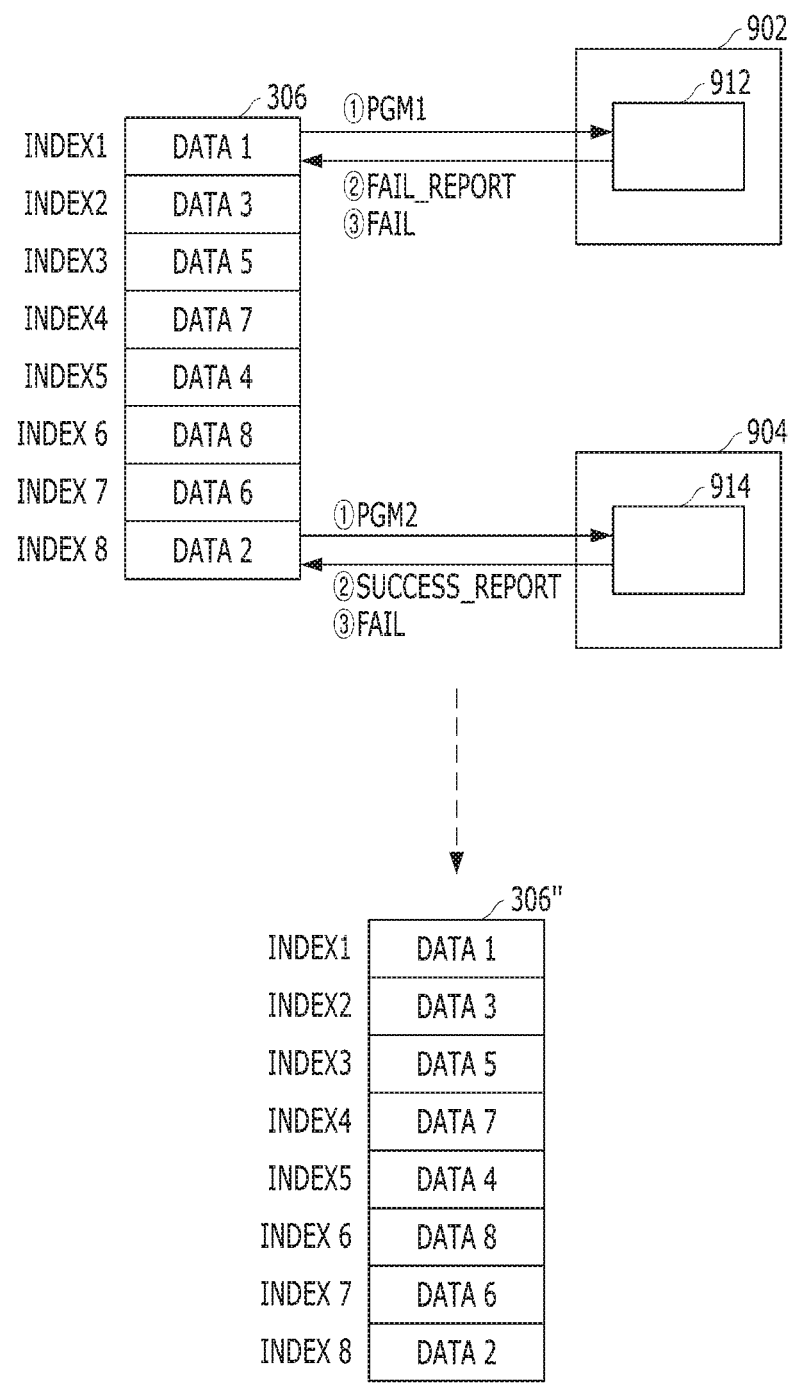
FIG. 10B is a diagram illustrating a method of operating a write buffer in accordance with another embodiment of the present invention.

FIG. 10B illustrates a method of operating a write buffer in accordance with another embodiment of the present invention.

According to another embodiment of the present invention, when the first program operation PGM1 is a failure during an interleave program operation and then the second program operation PGM2, which is a subsequent program operation performed after the first program operation PGM1, is a success while operating the write buffer 306 based on the scatter-gather scheme simultaneously, the controller 130 may force the second program operation PGM2 to fail. When the first program operation PGM1 is a failure, even though the second program operation PGM2 is a success, the controller 130 may retain the second data DATA2 in the write buffer 306. Therefore, the controller 130 may control the memory device 150 to perform an error handling operation by using the first data DATA1 and the second data DATA2 that are stored in the write buffer 306.

Referring to FIG. 10B, when the first program operation PGM1 is a failure and the second program operation PGM2 is a success, the memory device 150 may provide the controller 130 with a failure signal FAIL_REPORT for the first program operation PGM1 and a success signal SUCCESS_REPORT for the second program operation PGM2. The controller 130 may force the second program operation PGM2 to fail with the second data DATA2 in response to the failure signal FAIL_REPORT (indicating the failure of the first program operation PGM1 with the first data DATA1) and the success signal SUCCESS_REPORT (indicating the success of the second program operation PGM2 with the second data DATA2).

When the second program operation PGM2 is forcibly processed as failure with the second data DATA2 due to the failure of the first program operation PGM1 with the first data DATA1, the controller 130 may retain the first and second data DATA1 and DATA2 that are buffered in a write buffer 306″ based on the scatter-gather scheme, and may not be provided with additional data from the host 102. According to the embodiment of the present invention, since the first and second data DATA1 and DATA2 exist in the write buffer 306″ at the moment when an error handling operation is performed the controller 130 may control the memory device 150 to perform an error handling operation not only for the first data DATA1 but also for the second data DATA2.

Figure 11:
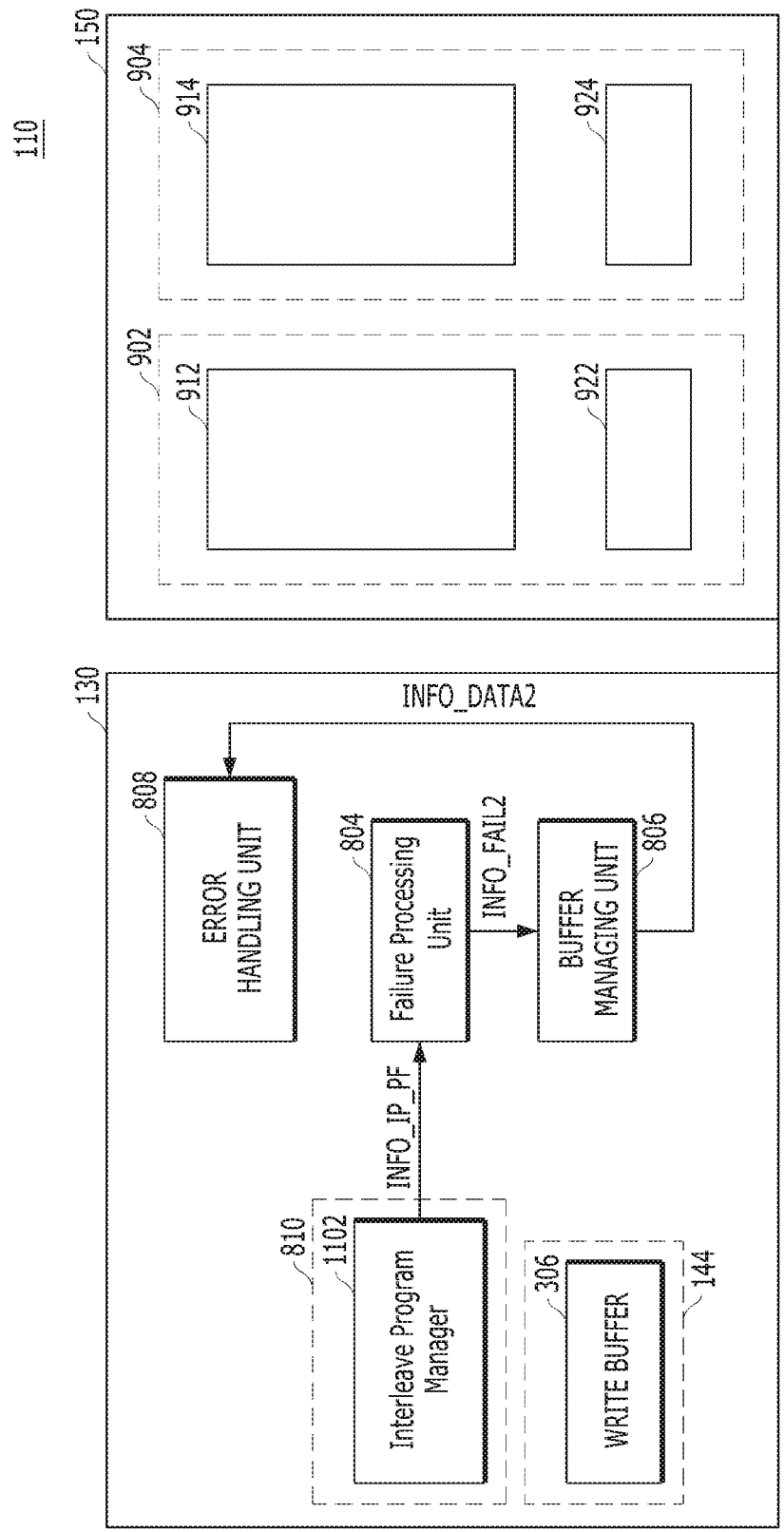
FIG. 11 is a block diagram illustrating a memory system 110 in accordance with another embodiment of the present invention.

FIG. 11 is a block diagram illustrating a memory system 110 in accordance with another embodiment of the present invention. FIG. 11 schematically shows only the constituent elements related to the present invention in the data processing system 100 of FIG. 1.

The memory device 150 may include a first memory die 902 and a second memory die 904. The first memory die 902 may include a first memory block 912 and a first page buffer 922, and the second memory die 904 may include a second memory block 914 and a second page buffer 924.

The controller 130 may include an interleave program manager 1102, a write buffer 306, a failure processing unit 804, a buffer managing unit 806, and an error handling unit 808.

The interleave program manager 1102 may control the memory device 150 to perform an interleave program operation. The interleave program manager 1102 may control the memory device 150 to simultaneously program the first and second data DATA1 and DATA2 buffered in the write buffer 306 into the first memory block 912 and the second memory block 914 that are included in different memory dies. After the memory device 150 buffers the first data DATA1 buffered in the write buffer 306 in the first page buffer 922, the interleave program manager 1102 may control the memory device 150 to perform a second program operation PGM2 of programming the second data DATA2 into the second memory block 914 by buffering the second data DATA2 buffered in the write buffer 306 in the second page buffer 924, while performing a first program operation PGM1 of programming the first data DATA1 into the first memory block 912. The interleave program manager 1102 may provide the failure processing unit 804 with information INFO_IP_PF about whether the interleave program operation of the memory device 150 is a success or not.

The failure processing unit 804 may process a program operation as a failure based on the provided information INFO_IP_PF about whether the interleave program operation of the memory device 150 is a success or not. According to another embodiment of the present invention, when the first program operation PGM1 is a failure with the first data DATA1 while an interleave program operation is performed, the failure processing unit 804 may force the second program operation PGM2 to fail with the second data DATA2 due to the failure of the first program operation PGM1 with the first data DATA1 even though the second program operation PGM2 is a success with the second data DATA2. The failure processing unit 804 may provide the buffer managing unit 806 with second failure information INFO_FAIL2 which is information on the first program operation PGM1 and the second program operation PGM2 that are a failure with the first data DATA1 and the second data DATA2 while an interleave program operation is performed.

According to another embodiment of the present invention, when the first program operation PGM1 is a failure with the first data DATA1 while an interleave program operation is performed, the failure processing unit 804 may force the second program operation PGM2 to fail with the second data DATA2 and, thus, the buffer managing unit may retain both the first data DATA1 and the second data DATA2 in the write buffer 306. This is regardless of whether or not the second program operation PGM2 is a success with the second data DATA2. Therefore, as will be described later in more detail, the buffer managing unit 806 may retain not only the first data DATA1 but also the second data DATA2 in the write buffer 306. Also, the error handling unit 808 may perform an error handling operation for an interleave program operation as well as operating a write buffer based on the scatter-gather scheme at the same time by controlling the memory device 150 to perform an error handling operation by using the first and second data DATA1 and DATA2 that are buffered in the write buffer 306.

The buffer managing unit 806 may buffer the data provided from the host 102 in the write buffer 306 and delete the programmed data from the write buffer 306 according to the scatter-gather scheme as described above with reference to FIGS. 5A to 5C. According to another embodiment of the present invention, when the first program operation PGM1 is a failure during the interleave program operation, the failure processing unit 804 may force the second program operation PGM2 to fail regardless of whether the second program operation PGM2 is a success or not. When the failure processing unit 804 forces the second program operation PGM2 to fail with the second data DATA2 during the interleave program operation based on the second failure information INFO_FAIL2 (indicating the failure of the first program operation PGM1 with the first data DATA1) provided from the failure processing unit 804, the buffer managing unit 806 may perform an error handling operation for an interleave program operation based on the scatter-gather scheme by retaining all of the first data DATA1 and the second data DATA2 in the write buffer 306. The buffer managing unit 806 may provide the error handling unit 808 with the second data information INFO_DATA2, which may be information on the data (e.g., the first data DATA1 and the second data DATA2) on the program operation (e.g., the first program operation PGM1 and the second program operation PGM2) that is a failure while the interleave program operation is performed.

The error handling unit 808 may control the memory device 150 to perform an error handling operation based on the provided second data information INFO_DATA2. When the failure processing unit 804 forces the second program operation PGM2 performed during an interleave program operation to fail due to the failure of the first program operation PGM1, the error handling unit 808 may control the memory device 150 to perform the error handling operation by respectively programming the first and second data DATA1 and DATA2 buffered in the write buffer 306 in new normal memory blocks that are respectively included in the first memory die 902 and the second memory die 904, which are not the first memory block 912 and the second memory block 914 in which the first and second program operations PGM1 and PGM2 are respectively performed.

According to the embodiments of the present invention, even though the size of a write buffer may be small, a memory system may quickly perform a program operation according to a request from a host by using a write buffer based on a scatter-gather scheme. Also, when the preceding program operation performed right before a current program operation is a failure while the current program operation is being performed, error handling may be performed quickly and accurately by unconditionally forcing the current program operation to fail.

While the present invention has been described with respect to specific embodiments, it will be apparent to those skilled in the art that various changes and modifications may be made without departing from the spirit and scope of the invention as defined in the following claims.

What is claimed is:

1. A memory system, comprising:
   a memory device including a memory block, a page buffer, and first and second memory dies;
   a write buffer suitable for temporarily storing first and second data;
   a program managing unit suitable for controlling the memory device to sequentially perform first and second program operations on the memory block with the first and second data;
   a buffer managing unit suitable for managing the write buffer based on a scatter-gather scheme;
   a failure processing unit suitable for forcing the second program operation to fail when the first program operation is a failure; and
   an error handling unit suitable for controlling the program managing unit to perform the first and second program operations again for the first and second data that are temporarily stored in the write buffer when the second program operation is forced to fail.

2. The memory system of claim 1,
   wherein the program managing unit includes a cache program manager suitable for controlling the memory device to perform a cache program operation, and
   wherein the cache program manager provides the memory device with the second data and controls the memory device to temporarily store the second data in the page buffer while performing the first program operation and to perform the second program operation right after completing the first program operation.

3. The memory system of claim 1,
   wherein the program managing unit includes an interleave program manager suitable for controlling the memory device to perform an interleave program operation, and
   wherein the interleave program manager controls the memory device to perform the second program operation on a second memory block included in the second memory die while performing the first program operation on a first memory block included in the first memory die.

4. The memory system of claim 2, wherein when the first program operation is a failure while the cache program operation is performed, the failure processing unit forces the second program operation to fail.

5. The memory system of claim 4, wherein when the second program operation is forced to fail while the cache program operation is performed, the buffer managing unit retains the first and second data in the write buffer.

6. The memory system of claim 5, wherein the error handling unit controls the cache program manager to perform a cache program operation again by using the first and second data that are temporarily stored in the write buffer.

7. The memory system of claim 3, wherein when the first program operation is a failure while the interleave program operation is performed, the failure processing unit forces the second program operation to fail.

8. The memory system of claim 7, wherein when the second program operation is forced to fail while the interleave program operation is performed, the buffer managing unit retains the first and second data in the write buffer.

9. The memory system of claim 8, wherein the error handling unit controls the interleave program manager to perform the interleave program operation again by using the first and second data that are temporarily stored in the write buffer.

10. The memory system of claim 1, wherein when the program operation for the second data is a success, the buffer managing unit deletes the second data from the write buffer and temporarily stores a new data received from a host in an empty space created by deleting the second data.

11. A method for operating a memory system, comprising:
    temporarily storing first data and second data;
    sequentially performing a first program operation and a second program operation on a memory block with the first data and the second data;
    managing a write buffer based on a scatter-gather scheme;
    forcing the second program operation to fail when the first program operation is a failure; and
    controlling the first and second program operations to be performed again for the first and second data that are temporarily stored in the write buffer when the second program operation is forced to fail.

12. The method of claim 11, wherein the sequentially performing includes performing a cache program operation including:
    providing the memory device with the second data and controlling the memory device to temporarily store the second data in the page buffer while performing the first program operation; and
    performing the second program operation right after completing the first program operation.

13. The method of claim 11, wherein the sequentially performing includes performing an interleave program operation including controlling the memory device to perform the second program operation on a second memory block included in the second memory die while performing the first program operation on a first memory block included in the first memory die.

14. The method of claim 12, wherein the second program operation is forced to fail when the first program operation is a failure while the cache program operation is performed.

15. The method of claim 14, wherein the managing of the write buffer based on the scatter-gather scheme includes retaining the first and second data in the write buffer, when the second program operation is forced to fail while the cache program is performed.

16. The method of claim 15, wherein the controlling of the first and second program operations to be performed again includes performing the cache program operation again by using the first and second data that are temporarily stored in the write buffer, when the second program operation is forced to fail.

17. The method of claim 13, wherein the second program operation is forced to fail when the first program operation is a failure while the interleave program operation is performed.

18. The method of claim 17, wherein the managing of the write buffer based on the scatter-gather scheme includes retaining the first and second data in the write buffer, when the second program operation is forced to fail while the interleave program operation is performed.

19. The method of claim 18, wherein the controlling of the first and second program operations to be performed again includes performing the interleave program operation again by using the first and second data that are temporarily stored in the write buffer, when the second program operation is forced to fail.

20. The method of claim 11, wherein the managing includes deleting the second data from the write buffer and temporarily storing a new data received from a host in an empty space which is created by deleting the second data, when a program operation for the second data is a success.

* * * * *